United States Patent [19]
Marcellini

[11] 3,818,606
[45] June 25, 1974

[54] GAS SUPPLY APPARATUS FOR FLUIDIZATION TREATMENT REACTOR

[75] Inventor: Robert Ph. A. Marcellini, Freyming-Merlebach, France

[73] Assignee: Charbonnages De France, Paris, France

[22] Filed: Feb. 6, 1973

[21] Appl. No.: 330,054

[30] Foreign Application Priority Data
Feb. 16, 1972 France .............................. 72.05219

[52] U.S. Cl. .................................. 34/57 A, 23/284
[51] Int. Cl. ............................................ F26b 17/00
[58] Field of Search ........... 23/288 S, 284; 239/143; 222/108; 34/57 A

[56] References Cited
UNITED STATES PATENTS

| | | | |
|---|---|---|---|
| 2,629,938 | 3/1953 | Montgomery | 34/57 A |
| 3,598,374 | 8/1971 | Nauta | 34/57 A |
| 3,737,283 | 6/1973 | Nikles | 34/57 A |
| 3,746,516 | 7/1973 | Michand | 34/57 A |

*Primary Examiner*—Lloyd L. King
*Attorney, Agent, or Firm*—Karl W. Flocks

[57] ABSTRACT

In a fluidization treatment reactor, the base of the treatment chamber is a grid perforated by cavities, and the bottoms of the cavities are respectively connected by syphons to fluidizing agent supply ducts which are connected to a common supply manifold. The syphons provide traps to collect any particulate material which falls through the cavities if the fluidization agent supply pressure falls.

5 Claims, 3 Drawing Figures

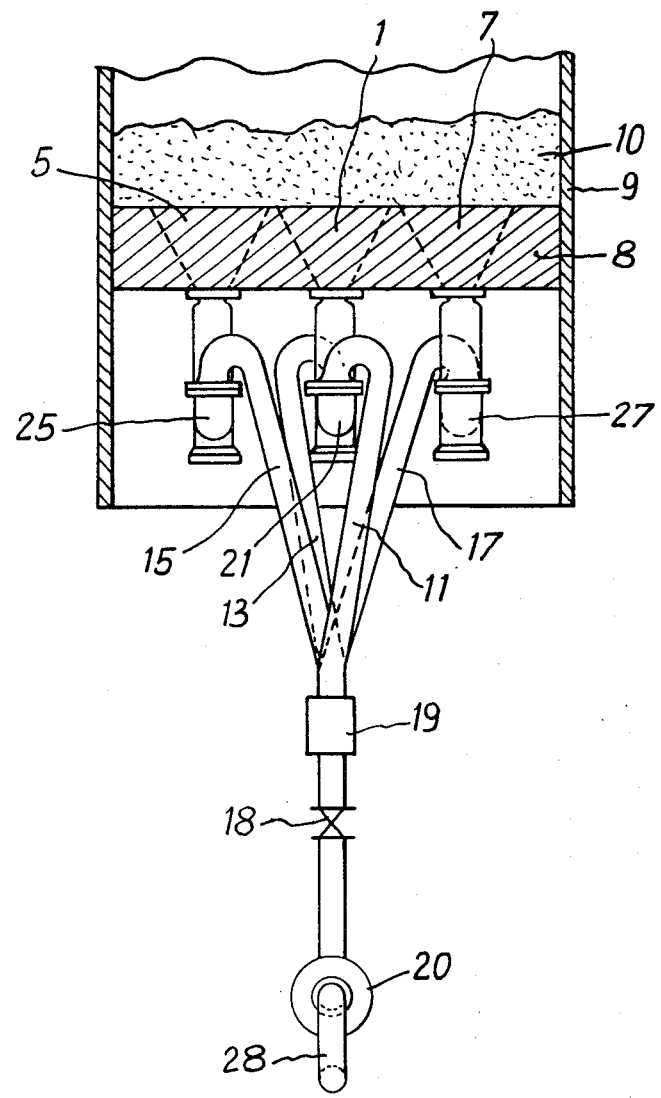

GAS SUPPLY APPARATUS FOR FLUIDIZATION TREATMENT REACTOR

BACKGROUND OF THE INVENTION

1. Field of the Invention

The invention relates to improvements in the supplying of gas to fluidization treatment reactors in which a layer of more or less fine particles of a material to be processed or to be made to react is held in fluidized suspension by an ascending stream of fluidizing gases.

2. Description of the Prior Art

For the distribution of the fluidizing gases over the entire cross-section of the reactor, there is usually provided at the base of the reactor a plate through which ascending current of fluidizing gas passes, on which base the layer of particles rests when the plant is shut down. This plate, normally called a grid, thus divides the reactor into two chambers namely: a first upper chamber constituting the treatment chamber into which the material in particulate form to be treated or to be made to react is introduced, and a second lower chamber called a "wind box" which is connected to the source of gaseous fluidizing agent. In some of these reactors, the grid is in the form of a plate of varying thickness in general of a refractory material, perforated with a multitude of holes of relatively small section through which the ascending stream of fluidizing gas passes. For certain other reactors, the multitude of holes are replaced by a much smaller number of cavities of much greater section, going right through the grid and placing the wind box in communication with the treatment chamber. Finally, with other reactors, the above-mentioned cavities are each joined to a common source of fluidizing agent by means of gas supply ducts independent of one another.

In all cases, the cross-section of the holes or of the cavities is generally greater than the size of the particles constituting the material to be processed or to be reacted. When the speed of the ascending stream of fluidizing gas is nil or inadequate, the layer of particles is not in a state of fluidized suspension and flows downwardly through the holes or the cavities and, as a result, accumulates either in the wind box or in the ducts supplying fluidizing agent to the cavities. Whereas the flow of the fluidized layer into the wind box is accompanied only by additional handling of the material to be processed, the flow into the ducts supplying fluidizing gas leads to the clogging of the ducts, which makes it more difficult to restart the plant and may necessitate either the cleaning of the said ducts, or their replacement.

To prevent this undesirable flow, the reactor grids fitted with a wind box have been provided with fixed or stationary, even retractable, valves, arranged either over or below the holes or the cavities, and intended to seal the said holes or the said cavities at the proper times. These valves are not easily fitted to grids whose cavities are supplied with fluidizing gas independently of each other.

An object of the present invention is to provide apparatus for supplying gas to a fluidization treatment reactor, avoiding the above-mentioned drawbacks and applicable to the grids of the type having cavities as mentioned above.

SUMMARY

Apparatus for supplying fluidizing gas to a fluidized layer treatment reactor includes a grid in the reactor to form the base of a treatment chamber. The grid is formed with cavity perforations each connected from beneath by a syphon to an individual fluidizing agent supply ducts. All the supply ducts are connected to a main supply manifold.

BRIEF DESCRIPTION OF THE DRAWINGS

FIG. 3 is a second cross-section view of the same reactor, made along a general direction perpendicular to the preceding cross-section, along line III—III of FIG. 1.

DESCRIPTION OF THE PREFERRED EMBODIMENT

Figure 1:
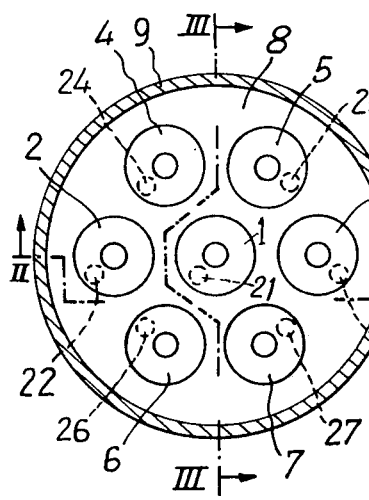
FIG. 1 is a top view of a grid of a fluidizing reactor fitted with a fluidizing gas supply device according to the invention.
Figure 2:
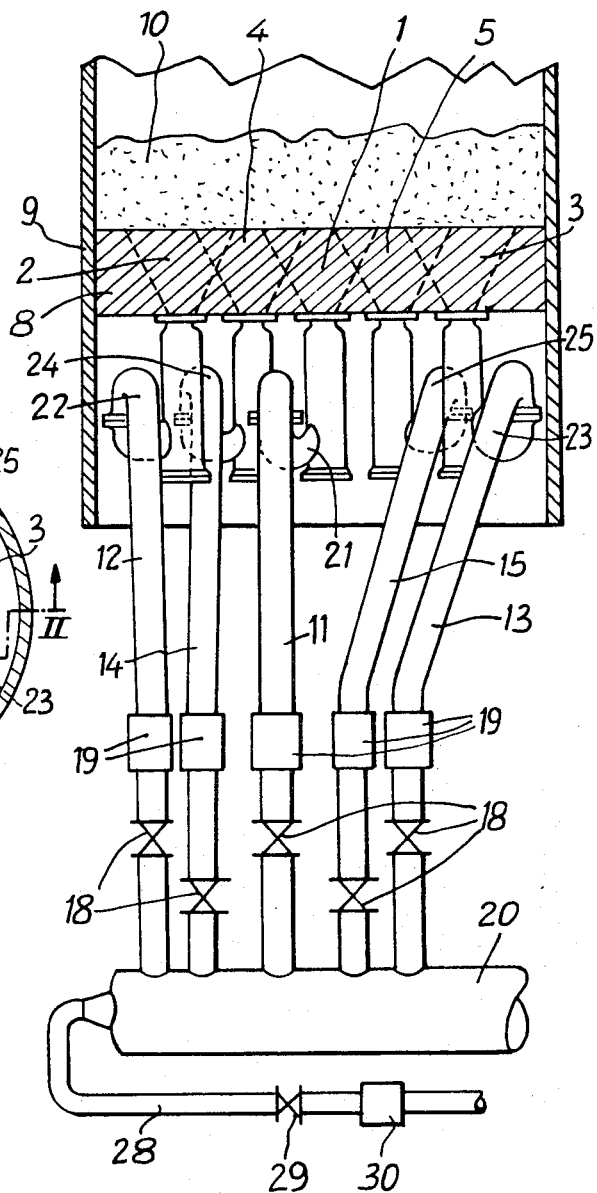
FIG. 2 is an elevation seen in cross-section of the base of this reactor, along line II—II of FIG. 1.

In the figures, the reference numerals 1 to 7 each denote one of seven cavities formed in a grid 8 which is located in the lower part of a fluidization reactor 9 for distributing an ascending current of fluidizing gas in a layer 10 of particles of material to be treated. In the embodiment illustrated by way of example, the cavities each have the shape of a truncated cone, widening out upwardly. Ducts 11 to 17 respectively supply fluidizing gas to the bases of the cavities 1 to 7 and are each fitted with a diaphragm 18 and a regulating valve 19 and are all connected to a main fluidizing agent manifold 20 connected to a source of fluidizing gas, not shown.

The upper part of each of the ducts 11 to 17 is connected to the base of one of the cavities 1 to 7 by means of a syphon 21 to 27.

When the plant is shut down, or when the flow of fluidizing agent is insufficient, the material to be processed flows through the cavities into the lower parts of the syphons 21 to 27, but is unable to flow into the ducts 11 to 17. The mass of the particles accumulated in the lower parts of syphons 21 to 27 is not generally sufficient to prevent the rapid restoration of the normal operation of the plant, that is to say the restoration of the fluidization state under the simple action of the introduction of fluidizing agent at rated pressure and flow.

In the most unfavourable case, for example when the particles have agglomerated at the base of a syphon, the only operation that is necessary to restore the plant to working order is the replacement of the syphon, which is much simpler, quicker and less costly than the replacement of the corresponding duct 11 to 17.

The device according to the invention makes it possible, in addition, to regulate the flow of fluidizing agent through each cavity, and to give it the optimum value corresponding to the local conditions of the fluidized layer.

The apparatus may advantageously include means making it possible to create a regulable leakage flow from the principal fluidizing agent manifold, for example by fitting the manifold 20 with a leakage flow duct 28 provided with a diaphragm 29 and a regulating valve 30, said leakage flow duct being exhausted either into the atmosphere, or into the treatment chamber of the fluidization reactor, or being connected to the source of fluidizing agent.

The addition of this leakage flow duct is particularly advantageous in the event of a gaseous fuel being introduced into the cavities independently of the fluidizing agent. Indeed, it is then possible to drain the ducts 11 to 17 if one or more of the cavities becomes choked causing flow back of the gaseous fuel upstream of the cavities, thereby avoiding an accumulation of an inflammable mixture of gases with the danger of explosion.

The invention is applicable to fluidization reactors in general, whether intended to carry out simple heat treatments of products by means of a hot or cold fluidizing gas, or to carry out more complex treatments of particulate material either by the contact of the fluidizing gases with the material, or by the contact of the particles with other products.

I claim:

1. Apparatus for supplying fluidizing agent to a fluidized layer treatment reactor, comprising a grid in the reactor which grid is formed with cavity perforations, a main supply means for fluidizing agent, a plurality of supply ducts for supplying fluidizing agent to said cavities and each connected to said main fluidizing agent supply means, and a corresponding plurality of bent traps respectively connecting said supply ducts to said cavities.

2. Apparatus according to claim 1, including in each said supply duct, a diaphragm and a fluidizing agent flow regulating valve.

3. Apparatus according to claim 1, wherein said main supply means comprises a main fluidizing agent supply manifold.

4. Apparatus according to claim 3, including a leakage flow duct connected to said manifold and, in said leakage flow duct, a diaphragm and a valve regulating leakage flow from said manifold.

5. A fluidized layer treatment reactor comprising a treatment chamber, a grid formed with cavity perforations forming the base of said treatment chamber, a plurality of bent traps located beneath the grid and respectively connected to said cavity perforations, a main supply means for fluidizing agent and a plurality of supply ducts respectively connecting said main supply means to said bent traps.

* * * * *